US008768809B1

(12) United States Patent
Cole et al.

(10) Patent No.: US 8,768,809 B1
(45) Date of Patent: Jul. 1, 2014

(54) METHODS AND SYSTEMS FOR MANAGING FINANCIAL DATA

(71) Applicant: Citibank, N.A., New York, NY (US)

(72) Inventors: Duncan Cole, Dublin (IE); Lucinda Gerhard, Brooklyn, NY (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 14/018,745

(22) Filed: Sep. 5, 2013

Related U.S. Application Data

(60) Provisional application No. 61/697,601, filed on Sep. 6, 2012.

(51) Int. Cl.
*G06Q 40/00* (2012.01)

(52) U.S. Cl.
CPC ..................................... *G06Q 40/00* (2013.01)
USPC ............................................. 705/35; 705/44

(58) Field of Classification Search
CPC ....... G06Q 40/00; G06Q 40/06; G06Q 40/02; G06Q 10/06375; G06Q 10/0635; G06Q 10/067; G06Q 10/04; G06Q 10/06315; G06Q 10/0637
USPC .......................... 705/36 R, 35, 348, 7.25, 7.36
See application file for complete search history.

(56) References Cited

U.S. PATENT DOCUMENTS

| | | | |
|---|---|---|---|
| 7,810,713 B2 * | 10/2010 | Lal et al. | 235/377 |
| 8,190,504 B1 * | 5/2012 | Stolz et al. | 705/36 R |
| 8,204,809 B1 | 6/2012 | Wise | |
| 2004/0128174 A1 | 7/2004 | Feldman | |
| 2007/0156550 A1 * | 7/2007 | Der Emde et al. | 705/35 |
| 2009/0043637 A1 | 2/2009 | Eder | |
| 2009/0150368 A1 | 6/2009 | Orumchian et al. | |
| 2010/0274711 A1 * | 10/2010 | Purchase et al. | 705/39 |
| 2013/0268307 A1 * | 10/2013 | Li et al. | 705/7.12 |

FOREIGN PATENT DOCUMENTS

| | | | |
|---|---|---|---|
| JP | 2006309739 A | 11/2006 | |
| KR | 2009001939 A | 1/2009 | |
| KR | 1095167 B1 | 12/2011 | |

OTHER PUBLICATIONS

Hwee, N. et al., "Model on Cash Flow Forecasting and Risk Analysis for Contracting Firms," International Journal of Project Management, 2002, pp. 351-363.

White, D., "The Economic Valuation of Improved Process Plant Decision Support Technology," ISA Transactions, 2007, pp. 437-442.

* cited by examiner

*Primary Examiner* — Elda Milef
(74) *Attorney, Agent, or Firm* — John M. Harrington, Esq.; Johnson, Marcou & Isaacs, LLC

(57) ABSTRACT

Methods and systems for managing financial data to measure the liquidity risk for a client involve, for example, implementing, using a computer having a processor coupled to memory, client-defined templates for a cash flow forecasting module. Also using the computer, forecast data for the client may be received via the client-defined templates by the cash flow forecasting module. Likewise using the computer, a real-time predictive aggregated measure of available cash flow for the client by currency by value date is generated by the cash flow forecasting module. In addition, a real time measure of forecast variance is computed by the cash flow forecasting module through pseudo logic matching of the actual cash flows at transaction level against the likely much higher level at which the forecasting process is operating.

17 Claims, 8 Drawing Sheets

| | | Current Month(Oct 2011) | | | | Current Month+1(Nov 2011) | | |
|---|---|---|---|---|---|---|---|---|
| | | Oct 01, 2011 | | | Oct 16, 2011 | Nov 01, 2011 | Nov 16, 2011 | |
| | | Forecast | Actual | Variance(%) | Forecast | Forecast | Forecast | |
| Starting Balance (USD) | | 0.00 | 0.00 | 0.00 | 22,531,458.40 | 29,298,229.89 | 29,298,229.89 | |
| BS-LIABILITIES — 102 | | | | | | | | |
| Outgoing | | | | | | | | |
| 104 — [-] Creditors (27) Aggr. Var: 0.00 | | 13,952.81 | | 100.00 | 0.00 | 0.00 | 0.00 | |
| Entity Name - Currency - Account Number | | | | | | | | |
| ABC HQ - USD - MANUAL | | 2,250.00 | 0.00 | 100.00 | 0.00 | 0.00 | 0.00 | |
| ABC CANADA Unit - USD - MANUAL | | 7,281.00 | 0.00 | 100.00 | 0.00 | 0.00 | 0.00 | |
| ABC CANADA Unit - CAD - MANUAL | | 4,421.81 | 0.00 | 100.00 | 0.00 | 0.00 | 0.00 | |
| 106 — [+] Equity(13) Aggr. Var: 4,517,549.23 | | 20,190,000.00 | 465.60 | 100.00 | 830,222.00 | 0.00 | 0.00 | |
| Total of BS-LIABILITIES | | 20,203,952.81 | 465.60 | 100.00 | 830,222.00 | 0.00 | 0.00 | |

Fig. 1A

| CASH FROM OPERATIONS | | | | | |
|---|---|---|---|---|---|
| Incoming | | | | | |
| [+] Cash from Operations (33) ⊞ Aggr. Var: 4,847.98 | 1,840,193.17 | 126,035.64 | 93.15 | 5,073,098.99 | 0.00 |
| Outgoing | | | | | |
| [+] Capital Expenditures (30) ⊞ Aggr. Var: 4,847.98 | 920,096.58 | 33,017.62 | 96.41 | 36,549.49 | 0.00 |
| Total of CASH FROM OPERATIONS | 920,096.58 | 93,017.82 | 89.89 | 5,036,549.49 | 0.00 |
| | | | | | |
| Incoming | | | | | |
| [+] Receivables (3) ⊞ Aggr. Var: 0.00 | 0.00 | 0.00 | 0.00 | 2,500,000.00 | 3,000,000.00 |
| Outgoing | | | | | |
| [+] Payables (3) ⊞ Aggr. Var: 0.00 | 0.00 | 0.00 | 0.00 | 1,600,000.00 | 1,800,000.00 |
| Total of INTERCOMPANY: | 0.00 | 0.00 | 100.00 | 900,000.00 | 1,200,000.00 |
| INVESTMENTS | | | | | |
| Incoming | | | | | |
| [-] Misc Receipt Custody (18) ⊞ Aggr. Var: 0.00 | 15,314.63 | 0.00 | 0.00 | 0.00 | 0.00 |

Fig. 1B

Forecast Template

| Home | Entity Management | Account Mgmt | User Management | Product Management | Rates/Spreads | Audit |

| Global Forecast Categories | Forecast Template | Master Transaction Codes | Cash position Categories | » |

| Forecast Template | Uploaded History | Forecast Template Order | Template Categories Order |

Customer/Business Unit: ABC HQ ▽ — 302
Category Template: Payables ▽ — 304

Template Type: Forecast ▽
Active: ☑  Save

| | Category Name | Incoming | Outgoing | Active | Mapping Code |
|---|---|---|---|---|---|
| ☑ | Salaries ▽ | No | Yes | Active | 3567 — 308 |
| ☑ | Loans ▽ — 306 | No | Yes | Active | 9890 — 310 |

Add  Cancel

Save

Fig. 3

Forecast Settings

| Home | Entity Management | Account Mgmt | User Management | Product Management | Rates/Spreads | Audit |

400

Help

Customer/Business Unit: ABC HQ ▽    Name: New ▽
Summary Period: 402 Monthly ▽    Split Period: Weekly (4) ▽  Split Current Weekly: 5 Day ▽
Start Date: Sep 06, 2011 📅 (Mon dd, yyyy)    End Date: Sep 06, 2012 📅 (Mon dd, yyyy)
Is Recurring ☐

Lock Period:
○ Specific Day    □Sunday  □Monday  □Tuesday  □Wednesday  □Thursday  □Friday  □Saturday ○ Specific Date
☐1   ☐2   ☐3   ☐4   ☐5   ☐6   ☐7   ☐8   ☐9   ☐10  ☐11  ☐12  ☐13  ☐14  ☐15
☐16  ☐17  ☐18  ☐19  ☐20  ☐21  ☐22  ☐23  ☐24  ☐25  ☐26  ☐27  ☐28  ☐29  ☐30
☐31

Holiday Rule
⊙ Before Holiday    ○ After Holiday    ○ Skip Holiday

Lock Forecast
Allow edits for Forecast: ○    Do not allow edits for Forecast: ○ ——406

Lock Actual
Allow edits for Actual: ○    Do not allow edits for Actual: ○ ——404
Lock period with Advance: [    ]

[Save] [Delete] [Clear] [Return]

Fig. 4

| | | Jun 01, 2011 | Jun 02, 2011 | Jun 03, 2011 | Jun 06, 2011 | Jun 07, 2011 | Jun 08, 2011 | Jun 09, 2011 |
|---|---|---|---|---|---|---|---|---|
| Starting Balance | 3 | 587.86 | 627.79 | (4,321.28) | (4,295.34) | (4,274.90) | (4,256.45) | (4,243.50) |
| Manual Beg. Ca... | | | | | | | | |
| Incoming | | | | | | | | |
| [+] Beginning Cash balance (18) | 0.52 | 0.53 | 0.53 | 0.53 | 0.53 | 0.53 | 0.53 | 0.53 |
| Total of Manual Beg. Cash Override | 0.52 | 0.53 | 0.53 | 0.53 | 0.53 | 0.53 | 0.53 | 0.53 |
| RECEIPTS: | | | | | | | | |
| Outgoing | | | | | | | | |
| [+] A/R Collections (3) | 0.00 | 0.00 | 356.00 | 0.00 | 0.00 | 0.00 | 0.00 | 510.00 |
| [+] Other (3) | 0.00 | 0.00 | 356.00 | 0.00 | 0.00 | 0.00 | 0.00 | 510.00 |
| Total of RECEIPTS: | 0.00 | 0.00 | 712.00 | 0.00 | 0.00 | 0.00 | 0.00 | 1,036.00 |
| OPERATING DISBURSEMENTS | | | | | | | | |
| Outgoing | | | | | | | | |
| [+] Payroll & Comm/Bonus (3) | 0.00 | 0.00 | 356.00 | 0.00 | 0.00 | 0.00 | 0.00 | 510.00 |

Export Excel-Cash Balances

2. System executes pre defined forecast rules and updates the rule based repository.
3. System has the ability to amend the rule from forecast view and the updates the forecast data on the fly (or) one specific forecast period data can be modifiable.
4. User can amend/delete or can make existing rules in-Active.

Fig. 5B

METHODS AND SYSTEMS FOR MANAGING FINANCIAL DATA

PRIORITY APPLICATION

This application claims the benefit of U.S. Provisional Application No. 61/697,601 filed Sep. 6, 2012 entitled "METHODS AND SYSTEMS FOR MANAGING FINANCIAL DATA" and incorporated herein by this reference.

FIELD OF THE INVENTION

The present invention relates generally to the field of financial data management, and more particularly to methods and systems for tracking, reporting and forecasting cash flows to support liquidity risk management.

BACKGROUND OF THE INVENTION

Currently, a financial institution, such as a global bank, may provide one or more tools for managing financial data for its customers, such as large international corporations. One of such tools may be provided by the financial institution, for example, for the treasury department within such corporations to manage their liquidity/liquidity risk and in some cases their securities and other financial positions. Such a tool may provide, for example, a snapshot for someone in the corporation's treasury department to view the various different accounts and the cash balances therein.

For example, such corporations may typically have hundreds or thousands of accounts in different currencies around the world held by different legal entities, and such tools provided by the financial institution may enable those corporations to manage those accounts. While the tools currently furnished may include some aspects of cash flow forecasting, they do not provide features, such as a real-time predictive measure of a firm's future cash availability with aggregation indicating an ability to pay future obligations in a given currency on a specific future value date.

Accordingly, there is a present need for methods and systems for managing financial data for customers that include additional features, such as a real-time predictive measure of a firm's future cash availability with aggregation indicating an ability to pay future obligations in a given currency on a specific future value date.

SUMMARY OF THE INVENTION

Embodiments of the invention employ computer hardware and software, including, without limitation, one or more processors coupled to memory and non-transitory computer-readable storage media with one or more executable computer application programs stored thereon which instruct the processors to perform the methods and systems for tracking, reporting and forecasting cash flows described herein.

Embodiments of the invention provide methods and systems for managing financial data for a client that may involve, for example, implementing, using a computer having a processor coupled to memory, client-defined transfer forms to capture a cash flow forecast within a cash flow forecasting module; receiving, using the computer, forecast cash flows for the client via the client-defined transfer forms by the cash flow forecasting module; and generating, using the computer, a real-time predictive aggregated measure of the future liquidity for the client by the cash flow forecasting module.

In aspects of embodiments of the invention, implementing the client-defined transfer forms may involve, for example, implementing client-defined forecast templates for the cash flow forecasting module. In further aspects, implementing the client-defined forecast templates further comprises implementing the client-defined forecast templates having a plurality of forecast categories for the cash flow forecasting module. In other aspects, implementing the client-defined forecast templates having the plurality of forecast categories may involve, for example, implementing the client-defined forecast templates having the plurality of forecast categories at a level at which the client forecasts the client's future cash flows, said forecast templates providing aggregation points for roll-up and analytics against said forecast categories.

In further aspects of embodiments of the invention, implementing the client-defined forecast templates having the plurality of forecast categories as aggregation points may involve, for example, adding one or more client-defined forecast templates and creating a roll-up relationship between forecast categories and forecast templates for the cash flow forecasting module. In still further aspects, implementing the client-defined forecast templates having the plurality of client-defined forecast categories may involve, for example, implementing the client-defined forecast categories with automatically generated unique identifiers for use of a same forecast category name across multiple forecast templates for the cash flow forecasting module.

In other aspects of embodiments of the invention, receiving the cash flows may involve, for example, receiving the cash flows for the client in real time via automated data feeds by the cash flow forecasting module. In additional aspects, receiving the cash flows may involve, for example, receiving at least one of budget cash flows, forecast cash flows, and actual cash flows for the client by the cash flow forecasting module. In further aspects, receiving the forecast and budget cash flows may involve, for example, receiving the forecast and budget cash flows for the client via Excel spreadsheet or directly online by the cash flow forecasting module. In still other aspects, receiving the actual cash flow information may involve, for example, receiving the actual cash flows for the client via Society of Worldwide Financial Telecommunications (SWIFT) messages, Bank Administration Institute (BAI) files, Excel spreadsheet, or directly online by the cash flow forecasting module.

In other aspects of embodiments of the invention, receiving the cash flows may involve, for example, receiving the actual cash flows and deducing a variance or accuracy of forecast cash flows for the client at a level in which the client performs a forecasting process, utilizing pseudo logic in the cash flow forecasting module based on transaction level details provided through SWIFT messages or BAI files.

In still other aspects of embodiments of the invention, generating the real-time predictive aggregated measure of future liquidity may involve, for example, generating a real-time predictive measure of aggregated cash availability by currency by value date for payment of future obligations or draw down for onward investment. In other aspects, generating the real-time predictive aggregated measure of cash availability by currency by value date may involve, for example generating a real-time predictive measure of available cash flow integrated with inter-company loan settlement flows of the client by the cash flow forecasting module. In further aspects, generating the real-time predictive aggregated measure of future liquidity for the client may involve, for example, filtering the received cash flows by legal entity, business unit, or geography by the cash flow forecasting module. In further aspects of embodiments of the invention, generating the real-time predictive aggregated measure of future liquidity for the client may involve, for example, filtering the received cash flows using a "summary by" function to control forecast liquidity time horizon and frequency reporting by the cash flow forecasting module. In other aspects, generating the real-time predictive aggregated measure of available cash flow may involve, for example, performing a 'what if' scenario analysis of forecast line items to reflect client-defined stress conditions that may impact future liquidity positions to deduce whether liquidity buffers in place are sufficient according to pre-defined parameters.

These and other aspects of the invention will be set forth in part in the description which follows and in part will become more apparent to those skilled in the art upon examination of the following or may be learned from practice of the invention. It is intended that all such aspects are to be included within this description, are to be within the scope of the present invention, and are to be protected by the accompanying claims.

BRIEF DESCRIPTION OF THE DRAWINGS

FIGS. 1A and 1B illustrate upper and lower portions, respectively, of an example of a cash flow forecast graphical user interface (GUI) screen for embodiments of the invention;

FIG. 3 is an example of a forecast template GUI screen for embodiments of the invention;

FIG. 4 is an example of a forecast settings GUI screen for embodiments of the invention;

FIGS. 5A and 5B illustrate upper and lower portions, respectively, of an example of a cash flow forecast GUI screen for embodiments of the invention.

DETAILED DESCRIPTION

Figure 2:
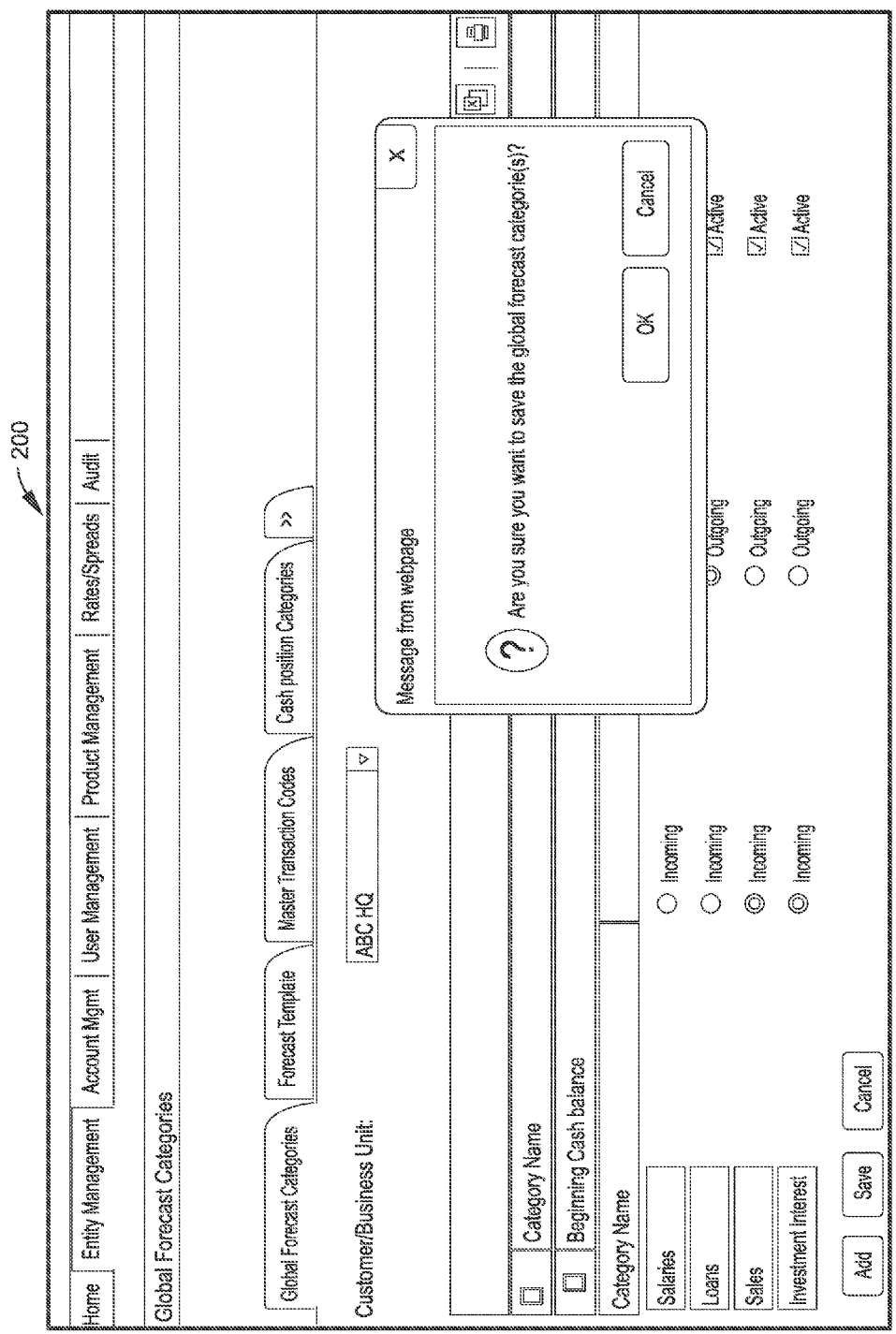
FIG. 2 is an example of a global forecast categories GUI screen for embodiments of the invention.

Reference will now be made in detail to embodiments of the invention, one or more examples of which are illustrated in the accompanying attachments. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used in another embodiment to yield a still further embodiment. Thus, it is intended that the present invention cover such modifications and variations that come within the scope of the invention. It is to be understood that embodiments of the invention may be deployed as an application on a processor of a financial institution server and accessed by a client from a client computing device coupled to the server, for example, via a wireless or wired network.

Embodiments of the invention may provide, for example, as a component of a tracking, reporting and forecasting financial flow tool, a cash flow forecasting module that supports a real-time predictive measure of a firm's cash availability and ability to pay future obligations in a given currency and with a specific value date. Embodiments of the invention may employ, for example, a set of client-defined matching rules that automates the matching of actual cash settlement activity at transaction level against the previously forecast cash settlement transactions (cash flows) to deduce the forecast accuracy. Embodiments of the invention may also employ automated data feeds that may include, for example, third party bank information via SWIFT and/or BAI interfaces. Such automated data feeds may also include, for example, intercompany loan settlement cash flows generated by the company itself.

Embodiments of the invention may also perform automated accuracy analysis against data feeds ingested automatically at both the end of the day and intra-day enabling tracking to end of day forecast liquidity position. In addition, the cash flow forecasting module for embodiments of the invention may perform a 'what if' scenario test that allows users to modify specific variables and simulate cash flow activity that will impact future liquidity positions by currency by value date in order to gauge the impact of those stress scenarios on the liquidity access plan and liquidity buffers. The what if forecast scenario may be maintained, for example, separately such that it does not impact live most recent forecast data in the system.

As noted, embodiments of the invention may employ real-time automated data feeds that may include, for example, third party bank information via SWIFT and/or BAI interfaces, as well as intercompany loan cash settlements originating from intercompany loans, such as term loans booked within the broader TREASURYVISION® application. Such data feeds may be linked, for example, to the cash flow forecasting module for embodiments of the invention. Thus, transactions and other data received through transaction networks, such as SWIFT, may be fed into the cash flow forecasting module in real time, which may adjust balances accordingly.

In addition, embodiments of the invention may employ, for example, a set of client-defined matching rules that automates the matching of actual cash settlement activity at transaction level against the previously forecast cash settlement transactions (cash flows) to deduce the forecast accuracy. For example, as different feeds of information are received from different sources, the cash flow forecasting module may enable clients to define how to understand the particular data that is received and how it is formatted via the client-defined rules in connection with the data feeds and match these cash flows to the forecast cash flows at forecast category level.

According to embodiments of the invention, the cash flow forecast employs one or more forecast templates that may be client-defined. FIGS. 1A and 1B show upper and lower portions, respectively, of an example of a cash flow forecast graphical user interface (GUI) screen 100 for embodiments of the invention. Referring to FIGS. 1A and 1B, the forecast templates, such as "BS-LIABILITIES" 102, may include, for example, one or more forecast categories, such as "creditors" 104 and/or "equity" 106 that is the two tier aggregation structure for the forecast cash flows that are presented to the application at the forecast category level for embodiments of the invention. Such information may be classified, for example, as budget cash flows, forecast cash flows, or actual cash flows.

Forecast, actual and budget cash flows may be loaded into the application for embodiments of the invention through Excel sheet upload or directly on-line. On the other hand, actual cash flow information may also be provided from SWIFT statement messages and/or through BAI files. It is to be understood that references herein to forecast, budget, or actual cash flows relate to the same types of information but which may have different values at different points in time. For example, budget information for salaries may be available before forecast information for salaries, which in turn may be available before actual information for salaries.

FIG. 2 is an example of a global forecast categories GUI screen 200 for embodiments of the invention. Referring to FIG. 2, the global forecast categories for embodiments of the invention are captured through this screen and are fully client configurable.

FIG. 3 is an example of a forecast template GUI screen 300 for embodiments of the invention. Referring to FIG. 3, one or more forecast category templates 302 may also be added and a roll-up relationship may be created between categories 304, 306 and forecast category templates 302. Further, mapping codes 308, 310 will be automatically created to enable the use of the same category name across multiple templates. FIG. 4 is an example of a forecast settings GUI screen 400 for embodiments of the invention. Referring to FIG. 4, information may be presented in different time periods 402 (e.g. daily, weekly, monthly) with split period reporting where near term forecast cash flows may be presented at higher frequencies than the longer term forecast cash flows where more ambiguity exists. Further, update/upload of both actual 404 and forecast 406 cash flows may be locked down to prevent editing on specific days or dates or period within a calendar month with user alerting to advise of same at a set number of days prior to the lock down period.

Large international corporations may typically have hundreds or thousands of accounts in different currencies around the world held by different legal entities. Embodiments of the invention may enable such corporations to manage those accounts. Further, such corporations may typically have inter-affiliate loans between different entities of the company. The cash flow forecasting module for embodiments of the invention is capable of incorporating data related to such loans. It is to be understood, however, that embodiments of the invention are equally useful in forecasting for smaller businesses at a legal entity level or other business-preferred level.

Figure 5A:
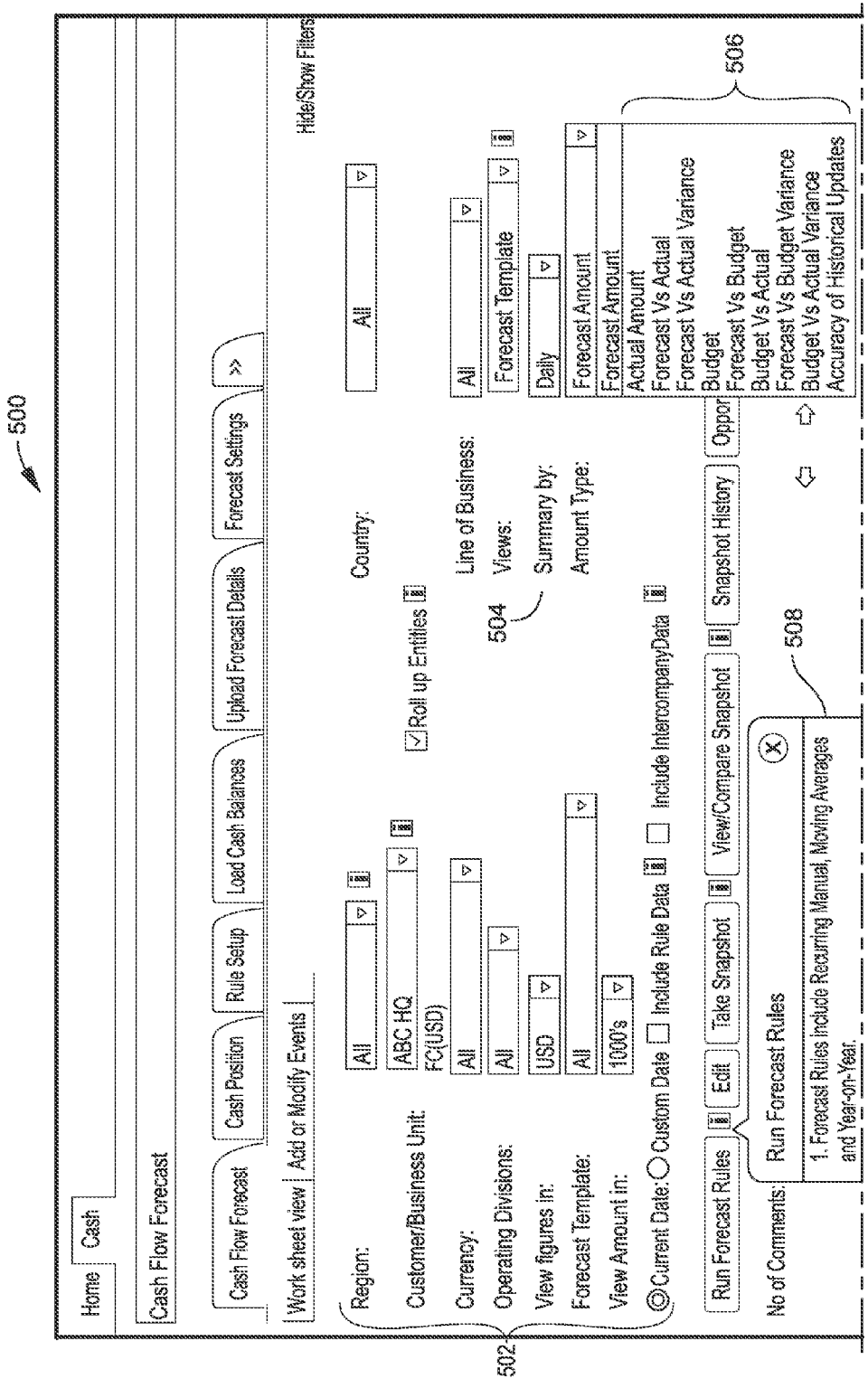

FIGS. 5A and 5B show upper and lower portions, respectively, of an example of a cash flow forecast GUI screen 500 for embodiments of the invention. Referring to FIGS. 5A and 5B, forecast data may be filtered 502, for example, by legal entity, business unit, or geography. In addition, a "summary by" filter 504 provides full control over forecast time horizon and frequency. Also, embodiments of the invention may provide a complete set of pre-defined reports 506, in addition to custom reports that may be created as needed. Further, predictive model rules 508 may be used for some or all elements of a forecast. Such predictive model rules may include, for example, a year-on-year moving average increase using statistical modeling or a flat percentage or amount increase/decrease.

In addition, embodiments of the invention may perform automated accuracy/variance analysis against data feeds ingested automatically at the end of the day or intraday. Assume, for example, that a client of the financial institution is provided a cash flow forecast that predicts the company's cash flow position two weeks from the present time. After the passage of two weeks, the cash flow forecasting module for embodiments of the invention may automatically through pseudo-matching rule logic determine and report the company's cash flow position relative to the predicted cash flow position. Transaction level details provided through SWIFT or BAI, enable clients to match and deduce the variance/accuracy of their forecast cash flows at the level in which they perform their forecasting process. The pseudo-matching rule" logic can be applied globally across all accounts or against a subset of accounts as defined by account level assignment to a forecast template or forecast template and category pairing or be applied at sub account level.

Additionally, the cash flow forecasting module for embodiments of the invention may provide a 'what if' scenario "stress test" capability that, for example, enables forecast line items to be time shifted in whole or in part to reflect various client-defined stress conditions. Thus, in order to gauge the impact of future scenarios, the 'what if' scenario capability may allow clients of the financial institution to modify specific variables and to simulate activity that may impact future liquidity positions. Such clients may modify a forecast by changing some of the assumptions and variables. For example, if certain customer payments are owed and expected, it is assumed in a cash flow forecast that such payments will be received. However, the cash flow forecasting module for embodiments of the invention may allow clients to change that assumption and generate a cash flow forecast based on the assumption that such customer payments will not be received. Therefore, the company is able to explore their liquidity risk and test their liquidity buffers under different scenarios by changing some of the underlying assumptions.

Figure 6:
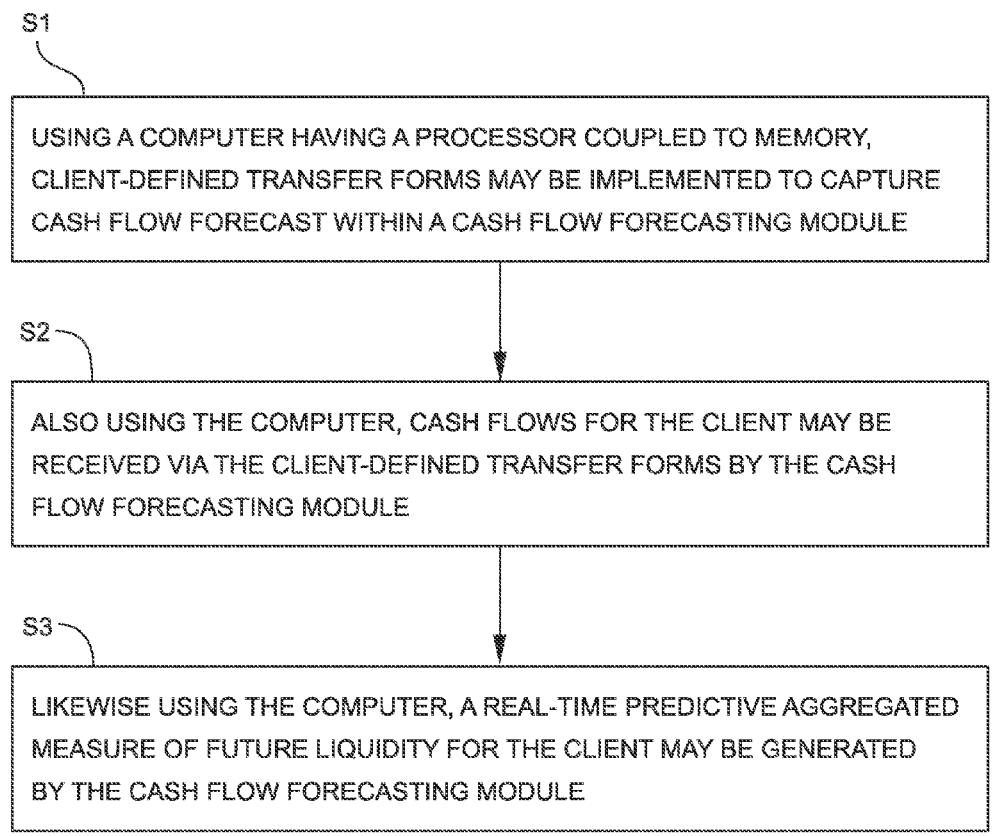
FIG. 6 is a flow diagram that illustrates an example of the process of managing financial data for a client for embodiments of the invention.

FIG. 6 is a flow diagram that illustrates an example of the process of managing financial data for a client for embodiments of the invention. Referring to FIG. 6, at 51, using a computer having a processor coupled to memory, client-defined transfer forms may be implemented to capture a cash flow forecast within a cash flow forecasting module. At S2, also using the computer, cash flows for the client may be received via the client-defined transfer forms by the cash flow forecasting module. At S3, likewise using the computer, a real-time predictive aggregated measure of future liquidity for the client may be generated by the cash flow forecasting module.

It is to be understood that embodiments of the invention may be implemented as processes of a computer program product, each process of which is operable on one or more processors either alone on a single physical platform, such as a personal computer, or across a plurality of platforms, such as a system or network, including networks such as the Internet, an intranet, a Wide Area Network (WAN), a Local Area Network (LAN), a cellular network, or any other suitable network. Embodiments of the invention may employ client devices that may each comprise a computer-readable medium, including but not limited to, Random Access Memory (RAM) coupled to a processor. The processor may execute computer-executable program instructions stored in memory. Such processors may include, but are not limited to, a microprocessor, an Application Specific Integrated Circuit (ASIC), and or state machines. Such processors may comprise, or may be in communication with, media, such as computer-readable media, which stores instructions that, when executed by the processor, cause the processor to perform one or more of the steps described herein.

It is also to be understood that such computer-readable media may include, but are not limited to, electronic, optical, magnetic, RFID, or other storage or transmission device capable of providing a processor with computer-readable instructions. Other examples of suitable media include, but are not limited to, CD-ROM, DVD, magnetic disk, memory chip, ROM, RAM, ASIC, a configured processor, optical media, magnetic media, or any other suitable medium from which a computer processor can read instructions. Embodiments of the invention may employ other forms of such computer-readable media to transmit or carry instructions to a computer, including a router, private or public network, or other transmission device or channel, both wired or wireless. Such instructions may comprise code from any suitable computer programming language including, without limitation, C, C++, C#, Visual Basic, Java, Python, Perl, and JavaScript.

It is to be further understood that client devices that may be employed by embodiments of the invention may also comprise a number of external or internal devices, such as a mouse, a CD-ROM, DVD, keyboard, display, or other input or output devices. In general such client devices may be any suitable type of processor-based platform that is connected to a network and that interacts with one or more application programs and may operate on any suitable operating system. Server devices may also be coupled to the network and, similarly to client devices, such server devices may comprise a processor coupled to a computer-readable medium, such as a RAM. Such server devices, which may be a single computer system, may also be implemented as a network of computer processors. Examples of such server devices are servers, mainframe computers, networked computers, a processor-based device, and similar types of systems and devices.

What is claimed is:

1. A method of managing financial data for a client comprising:
    implementing, using a computer having a processor coupled to memory, client-defined transfer forms to capture a cash flow forecast within a cash flow forecasting module;
    receiving, using the computer, cash flows for the client via the client-defined transfer forms by the cash flow forecasting module; and
    generating, using the computer, a real-time predictive aggregated measure of future liquidity for the client by the cash flow forecasting module, wherein generating the real-time predictive aggregated measure of future liquidity for the client further comprises generating a real-time predictive aggregated cash availability by currency and value date for payment of future obligations or drawdown for onward investment, and wherein generating the real-time predictive aggregated measure of cash availability by currency and value date further comprises generating a real-time predictive measure of available cash flow integrated with inter-company loan settlement flows of the client.

2. The method of claim 1, wherein implementing the client-defined transfer forms further comprises implementing client-defined forecast templates for the cash flow forecasting module.

3. The method of claim 2, wherein implementing the client-defined forecast templates further comprises implementing the client-defined forecast templates having a plurality of forecast categories for the cash flow forecasting module.

4. The method of claim 3, wherein implementing the client-defined forecast templates having the plurality of forecast categories further comprises implementing the client-defined forecast templates having the plurality of forecast categories at a level at which the client forecasts the client's future cash flows, said forecast templates providing aggregation points for roll-up and analytics against said forecast categories.

5. The method of claim 3, wherein implementing the client-defined forecast templates having the plurality of forecast categories as aggregation points further comprises adding one or more client-defined forecast templates and creating a roll-up relationship between forecast categories and forecast templates for the cash flow forecasting module.

6. The method of claim 3, wherein implementing the client-defined forecast templates having the plurality of client-defined forecast categories further comprises implementing the client-defined forecast categories with automatically generated unique identifiers for use of a same category name across multiple forecast templates for the cash flow forecasting module.

7. The method of claim 1, wherein receiving the cash flows further comprises receiving the cash flows for the client in real time via automated data feeds by the cash flow forecasting module.

8. The method of claim 1, wherein receiving the cash flows further comprises receiving at least one of budget cash flows, forecast cash flows, and actual cash flows for the client by the cash flow forecasting module.

9. The method of claim 8, wherein receiving the forecast and budget cash flows further comprises receiving the forecast and budget cash flows for the client via Excel spreadsheet or directly online by the cash flow forecasting module.

10. The method of claim 8, wherein receiving the actual cash flows further comprises receiving the actual cash flows for the client via Society of Worldwide Financial Telecommunications (SWIFT) messages, Bank Administration Institute (BAI) files, EXCEL spreadsheet, or directly online by the cash flow forecasting module.

11. The method of claim 8, wherein receiving the actual cash flows further comprises receiving the actual cash flows and deducing a variance or accuracy of forecast cash flows for the client at a level in which the client performs a forecasting process, utilizing pseudo logic in the cash flow forecasting module based on transaction level details received via SWIFT messages or BAI files.

12. The method of claim 1, wherein generating the real-time predictive aggregated measure of future liquidity for the client further comprises filtering the received cash flows by legal entity, business unit, or geography by the cash flow forecasting module.

13. The method of claim 1, wherein generating the real-time predictive aggregated measure of future liquidity consisting at least in part of a cash availability by currency and value date further comprises filtering the received cash flows using a "summary by" function to control forecast liquidity time horizons and frequency reporting by the cash flow forecasting module.

14. The method of claim 1, wherein generating the real-time predictive aggregated measure of available cash flow future liquidity further comprises performing a 'what if' scenario analysis of forecast line items to reflect client-defined stress conditions that may impact future liquidity positions to deduce whether liquidity buffers in place are sufficient according to pre-defined parameters.

15. A system for managing financial data for a client comprising:
    a processor coupled to memory, the processor being programmed for:
    implementing client-defined transfer forms to capture a cash flow forecast within a cash flow forecasting module;
    receiving cash flows for the client via the client-defined transfer forms by the cash flow forecasting module; and
    generating a real-time predictive aggregated measure of future liquidity for the client by the cash flow forecasting module, wherein generating the real-time predictive aggregated measure of future liquidity for the client further comprises generating a real-time predictive aggregated cash availability by currency and value date for payment of future obligations or drawdown for onward investment, and wherein generating the real-time predictive aggregated measure of cash availability by currency and value date further comprises filtering the received cash flows using a "summary by" function to control forecast liquidity time horizons and frequency reporting.

16. A system for managing financial data for a client comprising:
- a processor coupled to memory, the processor being programmed for:
- implementing client-defined transfer forms to capture a cash flow forecast within a cash flow forecasting module;
- receiving cash flows for the client via the client-defined transfer forms by the cash flow forecasting module; and
- generating a real-time predictive aggregated measure of future liquidity for the client by the cash flow forecasting module, wherein generating the real-time predictive aggregated measure of future liquidity for the client further comprises generating a real-time predictive aggregated cash availability by currency and value date for payment of future obligations or drawdown for onward investment, and wherein generating the real-time predictive aggregated measure of cash availability by currency and value date further comprises generating a real-time predictive measure of available cash flow integrated with inter-company loan settlement flows of the client.

17. A method of managing financial data for a client comprising:
- implementing, using a computer having a processor coupled to memory, client-defined transfer forms to capture a cash flow forecast within a cash flow forecasting module;
- receiving, using the computer, cash flows for the client via the client-defined transfer forms by the cash flow forecasting module; and
- generating, using the computer, a real-time predictive aggregated measure of future liquidity for the client by the cash flow forecasting module, wherein generating the real-time predictive aggregated measure of future liquidity for the client further comprises generating a real-time predictive aggregated cash availability by currency and value date for payment of future obligations or drawdown for onward investment, and wherein generating the real-time predictive aggregated measure of cash availability by currency and value date further comprises filtering the received cash flows using a "summary by" function to control forecast liquidity time horizons and frequency reporting.

\* \* \* \* \*